(12) United States Patent (10) Patent No.: US 12,585,907 B1

Saldana (45) Date of Patent: Mar. 24, 2026

(54) WEARABLE DATA STORAGE GARMENT

(71) Applicant: Rodolfo Saldana, Laverne, CA (US)

(72) Inventor: Rodolfo Saldana, Laverne, CA (US)

(*) Notice: Subject to any disclaimer, the term of this patent is extended or adjusted under 35 U.S.C. 154(b) by 0 days.

(21) Appl. No.: 18/601,841

(22) Filed: Mar. 11, 2024

(51) Int. Cl.
G06K 19/02 (2006.01)
G06K 19/07 (2006.01)

(52) U.S. Cl.
CPC ....... G06K 19/027 (2013.01); G06K 19/0723 (2013.01)

(58) Field of Classification Search
CPC .......................... G06K 19/027; G06K 19/0723
USPC ......................................................... 235/492
See application file for complete search history.

(56) References Cited

U.S. PATENT DOCUMENTS

| 9,440,144 | B2 * | 9/2016 | Mikhailov | .............. A63F 13/73 |
| 2007/0204498 | A1 * | 9/2007 | Clevenger | ................. G09F 3/14 |
| | | | | 40/672 |
| 2015/0114802 | A1 * | 4/2015 | Talbot | .................... B65G 43/00 |
| | | | | 198/810.01 |

| 2016/0375364 | A1 * | 12/2016 | Mikhailov | ............ A63F 13/235 |
| | | | | 463/29 |
| 2017/0245098 | A1 * | 8/2017 | Fortuna, Jr. | ........... A63F 13/219 |
| 2017/0325525 | A1 * | 11/2017 | Hyde | .................... A61G 7/1051 |
| 2019/0220636 | A1 * | 7/2019 | Yeh | ......................... A63G 33/00 |
| 2022/0203221 | A1 * | 6/2022 | Dobney | ................ A63F 13/212 |
| 2022/0309873 | A1 * | 9/2022 | Russ | ................... G07F 17/3272 |
| 2022/0309878 | A1 * | 9/2022 | He | ....................... G07F 17/3244 |

* cited by examiner

*Primary Examiner* — Allyson N Trail
(74) *Attorney, Agent, or Firm* — Alexander Postnikov

(57) ABSTRACT

A contactless identification tag capable of storing and wirelessly transmitting a variety of wearer data to a nearby reader. This technology not only represents a leap in wearable convenience, blending traditional clothing with digital data access and storage, but also supports a wide array of applications. Wearers can carry performance metrics from electronic games, access credentials for secure environments, or login details for various platforms, directly or via uniform resource identifiers. As a core component of a contactless identification system, this garment interacts with peripheral devices like USB housings or mousepads, enabling data transmission to computer systems for a range of interactive experiences, including real-time updates of gaming metrics. Moreover, it facilitates the selection of suitable digital or physical stations based on stored data, thus personalizing environments to the wearer's historical preferences and activities.

12 Claims, 4 Drawing Sheets

500

WEARABLE DATA STORAGE GARMENT

BACKGROUND

Field of the Invention

The present invention relates generally to contactless identification systems, and, in particular, to a wearable data storage garment.

Scope of the Prior Art

In personal use, RFID tag embedded clothing can interact with smart home systems to adjust environmental settings based on the wearer's preferences or facilitate seamless access control, allowing wearers to unlock doors or access secured areas without physical keys or cards. Additionally, such technology has been explored for health and safety purposes, where garments with RFID tags can store vital medical information or aid in the tracking and location of individuals in emergency situations. However, such embodiments have limited functionality.

SUMMARY

One aspect of this disclosure is directed at a sophisticated wearable data storage garment designed to seamlessly integrate into the daily life and digital interactions of its wearer. Central to this innovation is a garment body equipped with a waterproof housing, within which resides a contactless identification tag. This tag is engineered to store a range of wearer data and transmit this information to a contactless identification tag reader when in proximity, all without the need for an internal power source. This capability marks a significant advancement in wearable technology, merging the convenience of clothing with the utility of digital data storage and access.

The scope of data that can be stored and transmitted by this garment spans various practical applications. For instance, wearer data can include performance metrics from electronic gaming experiences, providing a unique link between the physical and virtual realms of a gamer's activities. Moreover, the garment can store and transmit location access credentials or login access credentials for websites, desktop, or mobile applications, facilitating a seamless interaction with secure environments or digital platforms. The data can either be stored directly or provided via a uniform resource identifier (URI), which guides the reader to the specific data location.

An integral part of a contactless identification system, the garment works in tandem with peripheral devices, such as a USB-type housing or a mousepad, which house the contactless identification tag reader. When these peripheral devices connect with a computer system, they enable the tag reader to communicate with the system, allowing for the transmission of stored data. This system not only enhances user convenience but also opens new pathways for interactive experiences, such as updating gaming performance metrics in real-time or post-gameplay, thereby enriching the gaming ecosystem.

Furthermore, the garment's technology extends to a method for selecting suitable stations from a multitude of available options, based on the wearer data received. This process can recommend computer systems equipped with games or work programs reflecting the wearer's history, thereby personalizing the digital environment to match the individual's preferences and history. Whether for gaming, work, or access to specific tools, the system's ability to inform the wearer of the selected station adds a layer of intelligent interaction, making the wearable garment not just a passive carrier of data but an active participant in enhancing the wearer's digital and physical environments.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context of contactless identification tags, it will be recognized by those of ordinary skill that the present disclosure is not so limited. In fact, the principles of the present disclosure described herein may be readily applied to contactless identification systems in general.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Figure 1:
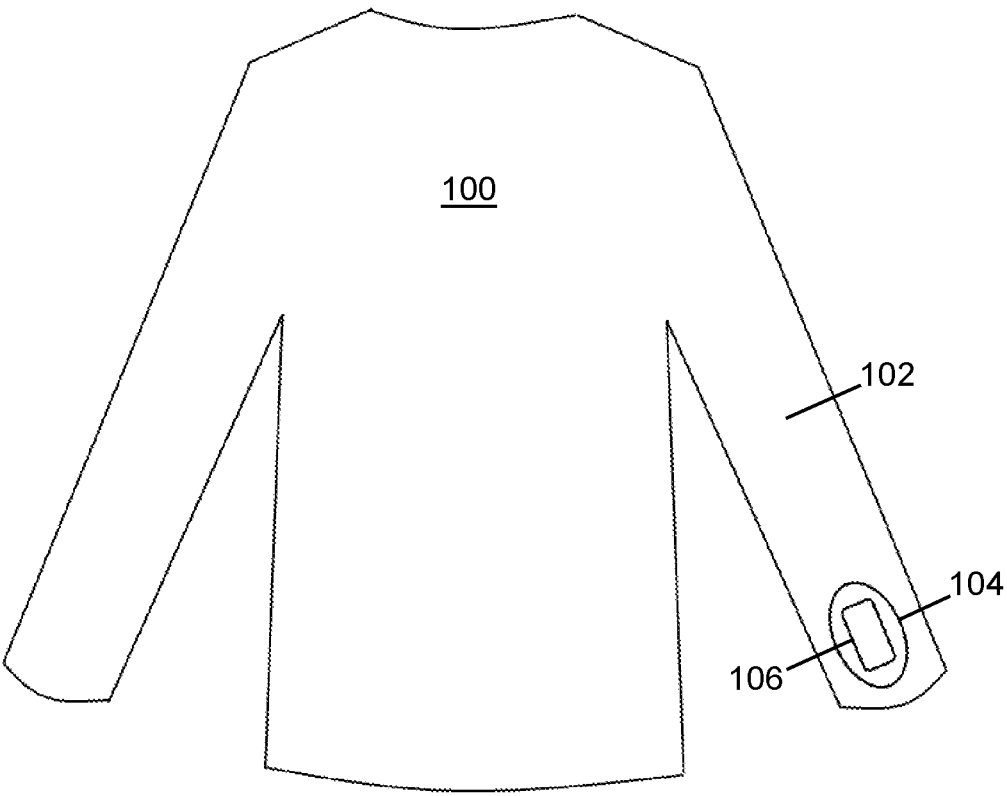
FIG. 1 is a back view of a wearable data storage garment, according to an embodiment.

FIG. 1 is a back view of a wearable data storage garment 100, according to an embodiment. The garment 100 may be comprised of a garment body 102, a waterproof housing 104, and a contactless identification tag 106.

The garment body 102 is a wearable clothing item or accessory. Preferably, the garment body 102 is a shirt having long sleeves.

In another embodiment, the garment body 102 is any clothing item that enables embedding of the contactless identification tag 106 near the wearer's hands. Such clothing items include, but are not limited to, jackets, coats, sportswear, athletic jerseys, work uniforms, school uniforms, outdoor wear, suits, hoodies, and healthcare apparel.

In another embodiment, the garment body 102 is any wearable accessory that enables embedding of the contactless identification tag 106 near the wearer's hands. Such accessories include, but are not limited to, fitness bands, watch bands, bracelets, wristlets, wristbands, rings, gloves, and hand wraps.

Having the embedded contactless identification tag 106 near the wearer's hands offers some distinct advantages. Hands are almost always freely movable and accessible, making it natural and easy to present the contactless identification tag 106 to a reader, whether for access control, payments, or identification. This increases speed in transactions or verifications. Furthermore, people are accustomed to using their hands to manipulate objects, including cards, keys, and smartphones. Placing contactless identification capabilities near the hands aligns with intuitive human behaviors, making the technology easier to adopt and use without requiring significant changes in habits. When the contactless identification tag 106 is used to access secured areas, the contactless identification tag 106 can be used in conjunction with hand-based security measures like fingerprint sensors.

The waterproof housing 104 is embedded in the garment body 102, preferably on a distal end of a sleeve. The waterproof housing 104 is constructed out of flexible, waterproof, and skin-friendly materials, for example, but not limited to, a Silicone or TPU (Thermoplastic Polyurethane) pouch. The waterproof housing 104 can be embedded via sewing, heat-sealing, placement in a garment cavity, and the like.

The contactless identification tag 106 is housed in the waterproof housing 104. Preferred contactless identification tags 106 include, but are not limited to, passive radio frequency identification (RFID) tags, passive near field communication (NFC) tags. Such tags do not have their own power source. Instead, they draw power from the reader's signal to activate and transmit data back. This functionality makes them cost-effective and low maintenance, ideal for a wide range of applications.

Figure 2:
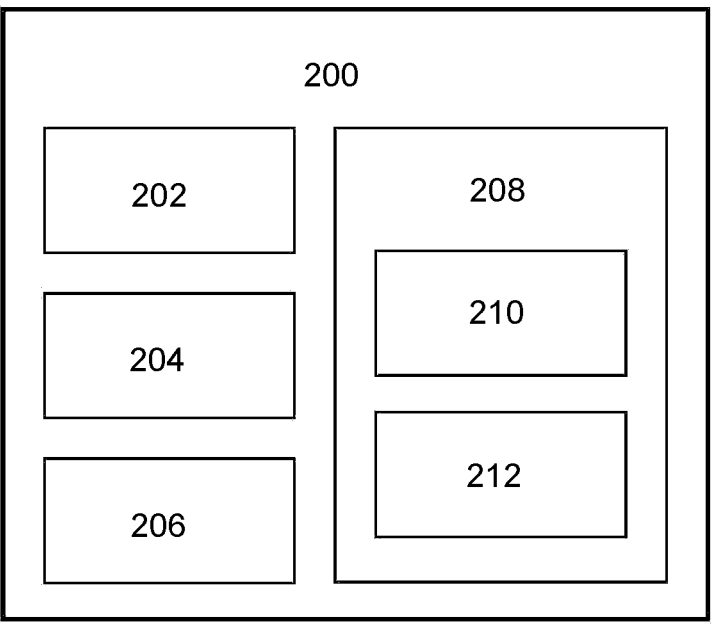
FIG. 2 is a block diagram illustrating example physical components of a contactless identification tag with which aspects of the present disclosure may be practiced.

FIG. 2 is a block diagram illustrating example physical components (hardware) of a contactless identification tag 200. The contactless identification tag 200 comprises a processing unit 202, an antenna 204.

The processing unit 202 executes commands to perform contactless identification tag 200 functions specified in flowcharts and/or block diagram blocks throughout this disclosure. It should be appreciated that processing may be implemented either locally via a microprocessor or remotely via various forms of wireless or wired networking technologies or a combination of both.

The antenna 204 is configured to capture electromagnetic waves from a contactless identification tag reader 300. For passive contactless identification tags, this energy is essential as it powers the tag. The antenna 204 also sends the stored wearer data 212 to the contactless identification tag reader 300 when activated.

Active and semi-active contactless identification tags may further comprise an output device 206 and an internal power source (not shown).

The output device 206 is used to interact with the wearer. According to an embodiment, the output device 206 may be a display screen in any of the various forms associated with smart devices. Alternatively, the output device 103 may be an LED, speaker, acoustic generator, or any other device or method of transmitting updates or data.

The internal power source actively powers the processing unit 202 and antenna 204, allowing for longer read ranges and the possibility of additional functionalities, such as sensors or the ability to transmit signals at predetermined intervals.

Memory 208 includes an operating system 210 and wearer data 212.

The operating system 210 is suitable to control the functionality of the contactless identification tag 106, including its process, memory, input/output, and networking.

Wearer data 212 includes any data related to a wearer.

In an embodiment, wearer data 212 includes performance metrics related to wearer performance in an electronic game (e.g., video games, computer games, mobile device games, mobile phone games). Such metrics can include, but are not limited to, kill/death ratio, win/loss ratio, score, level, game progress, objective control, and the like.

In another embodiment, wearer data 212 includes gameplay history of the wearer. Such history can include, but is not limited to, recent games played, recent game modes played, current favorite game, all time favorite game, time spent playing a game, favorite character in a game, and the like.

In another embodiment, wearer data 212 includes location access credentials. When a contactless identification tag reader 300 receives the location access credentials, the wearer is granted access to a location.

In another embodiment, wearer data 212 includes login access credentials. When a contactless identification tag reader 300 receives the login access credentials, the wearer is granted access to an account associated with a website, desktop application, or mobile application.

In another embodiment, wearer data 212 includes work history of the wearer. Such history can include, but is not limited to, recent programs used, recent tools used, required programs, required tools, and the like.

Wearer data 212 may be in the form of a uniform resource identifier that provides instructions on how to reach another resource that includes a wearer's performance metrics, gameplay history, work history, etc. Preferred uniform resource identifiers include, but are not limited to, URLs (Uniform Resource Locators), file paths, QR codes, and database indexes.

Figure 3:
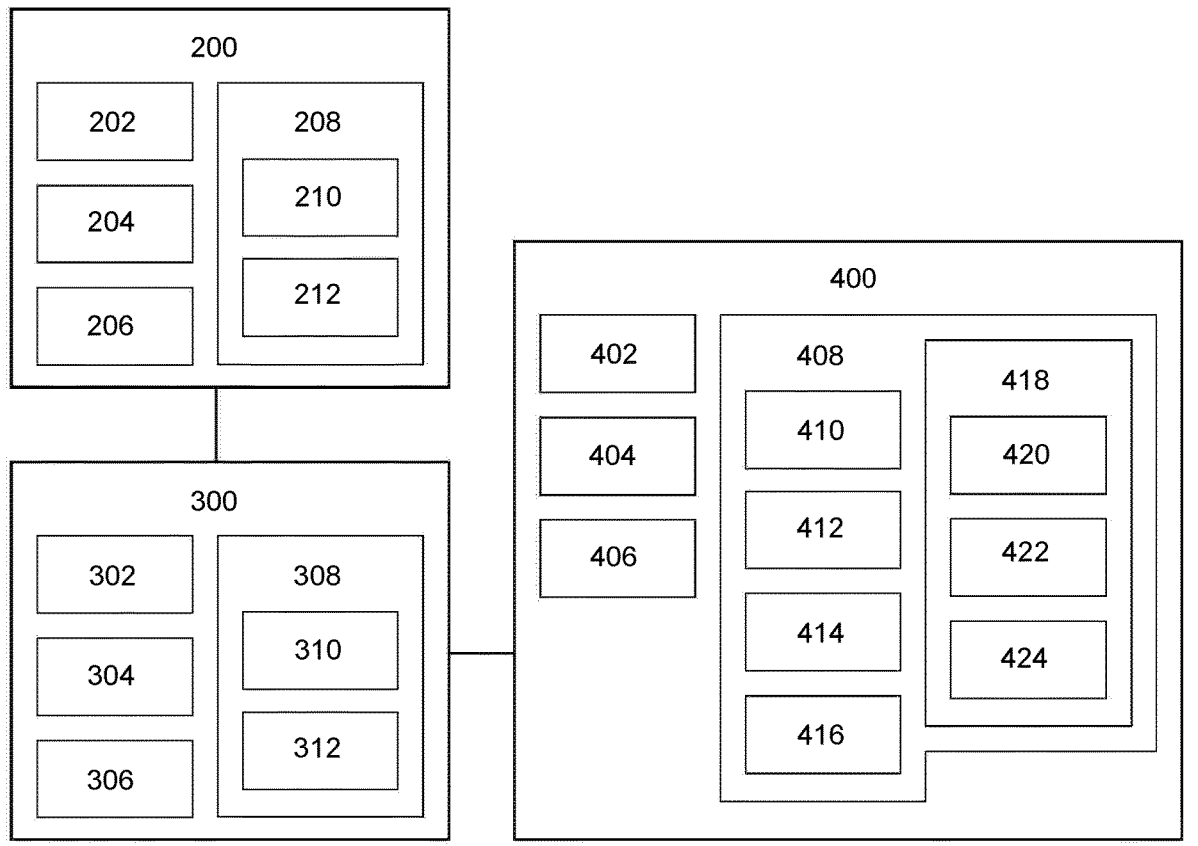
FIG. 3 is a block diagram illustrating example physical components of a contactless identification system with which aspects of the present disclosure may be practiced.

FIG. 3 is a block diagram illustrating example physical components of a contactless identification system. The contactless identification system comprises a contactless identification tag 200, a contactless identification tag reader 300, and a computer system 400.

The contactless identification tag reader 300 comprises a processing unit 302 and an antenna 304.

The processing unit 302 executes commands to perform contactless identification tag reader 300 functions specified in flowcharts and/or block diagram blocks throughout this disclosure. It should be appreciated that processing may be implemented either locally via a microprocessor or remotely via various forms of wireless or wired networking technologies or a combination of both.

The antenna 304 is configured to activate the contactless identification tag 200 and to read or write data to it. In some embodiments, separate antennas are used for transmitting and receiving signals.

The contactless identification tag reader 300 may further comprise an output device 306 and an internal power source (not shown). In some embodiments, the contactless identification reader 300 is connected to an external power source, such as the computer system 400.

Memory 308 includes an operating system 310 and other data 312.

The operating system 310 is suitable to control the functionality of the contactless identification tag reader 300, including its process, memory, input/output, and networking. Networking enables the contactless identification tag reader 300 to communicate with a computer system 400.

Other data 312 includes wearer data 212 and other temporary information being transmitted between the contactless identification tag 200 and the computer system 400.

Preferred contactless identification tag readers 300 include, but are not limited to, passive radio frequency identification (RFID) tag readers and passive near field communication (NFC) tag readers.

In some embodiments, the contactless identification tag reader 300 is housed in a peripheral device (not shown). For example, the peripheral device is a USB-type housing such as USB stick. When the peripheral device is inserted into a USB port on the computing system 400, the contactless identification tag reader 300 is in communication with, and receives power from, the computing system 400. Another preferred peripheral device is mousepad. The mousepad may be wired or wirelessly connected to the computer system 400 such that the contactless identification tag reader 300 is in communication with the computing system 400, and, for wired embodiments, receives power from the computing system 400.

The computer system 400 comprises a processing unit 402, a networking module 404, and an output device 406.

The processing unit 402 executes commands to perform computer system 400 functions specified in flowcharts and/or block diagram blocks throughout this disclosure. It should be appreciated that processing may be implemented either locally via a processor or remotely via various forms of wireless or wired networking technologies or a combination of both.

The networking module 404 enables the computer system 400 to communicate with the contactless identification tag reader 300.

The term memory 208, 308, 408, as used throughout this disclosure, may include computer readable storage media including, but not limited to, volatile and nonvolatile, removable and non-removable media implemented in any method or technology for storage of information, such as computer readable instructions, data structures, or program modules. Memory 208, 308, 408 may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the contactless identification tag reader 200, the contactless identification tag reader 300, and the computer system 400. Memory 208, 308, 408 does not include a carrier wave or other propagated or modulated data signal.

Memory 208, 308, 408 may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Memory 408 includes an operating system 410, wearer data 412, station data 414, and other data 416.

The operating system 410 is suitable to control the functionality of the computer system 400, including its process, memory, input/output, and networking. Networking enables the computer system 400 to communicate with the contactless identification tag reader 300.

Wearer data 412 includes any wearer data 212 received by the contactless identification tag reader 300.

Station data 414 includes data related to a station. Stations are separate physical locations such as computer stations, office cubicles, lab stations, and the like.

In another embodiment, station data 414 includes location access restrictions for each station. For example, there are three stations available. Station one can be accessed by a first location access credential, a second location access credential, or a third location access credential. Station two can be accessed by the second location access credential or the third location access credential. Station three can only be accessed by the third location access credential. If the received wearer data 212 includes the second location access credential, he or she is only given access to the first or second station.

In another embodiment, station data 414 includes login access restrictions for each station. For example, there are three stations available. Station one has a computer that can be accessed by a first login access credential, a second login access credential, or a third login access credential. Station two has a computer that can be accessed by the second login access credential or the third login access credential. Station three has a computer that can only be accessed by the third login access credential. If the received wearer data 212 includes the second login access credential, he or she is only given access to the first or second station.

In another embodiment, station data 414 includes game information for each station. For example, there are three stations available. Station one has a computer with games A, B, and C. Station two has a computer with games B and C. Station three has a computer with only game C. If the received wearer data 212 indicates that the wearer only plays game B, the first and section stations are selected as suitable stations.

In another embodiment, station data 414 includes program information for each station. For example, there are three stations available. Station one has a computer with programs A, B, and C. Station two has a computer with programs B and C. Station three has a computer with only program C. If the received wearer data 212 indicates that the wearer only uses program B, the first and section stations are selected as suitable stations.

In another embodiment, station data 414 includes tool data for each station. For example, there are three stations available. Station one has tools A, B, and C. Station two has tools B and C. Station three only has tool C. If the received wearer data 212 indicates that uses tool C for experiments, all three stations are selected as suitable stations.

Other data 416 may include a trained machine learning model configured to output a list of suitable stations based on received wearer data 212.

Memory 408 may include various types of short and long-term memory as is known in the art. Memory 408 may be loaded with various applications 418 in the form of computer readable program instructions. These computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Applications include a selection application 420, electronic game applications 422, and an activity recorder application 424.

The selection application 420 is configured to select a suitable station from a plurality of available stations. The selection is based on wearer data 212 received from the contactless identification tag 200. For example, there are three stations available. Station one has a computer with games A, B, and C. Station two has a computer with games B and C. Station three has a computer with only game C. If the received wearer data 212 indicates that the wearer only plays game B, the first and second stations are selected as suitable stations.

Electronic game applications 422 include, but are not limited to, video game applications, computer game applications, mobile device game applications, and mobile phone game applications.

The activity recorder application 424 is configured to record wearer activities during station use. For example, if the wearer is playing a computer game, his or her progress or other performance metrics for that gaming session are recorded. Such wearer activity data may be recorded to the memory 212 of the contactless identification tag 200 during or after station use.

Figure 4:
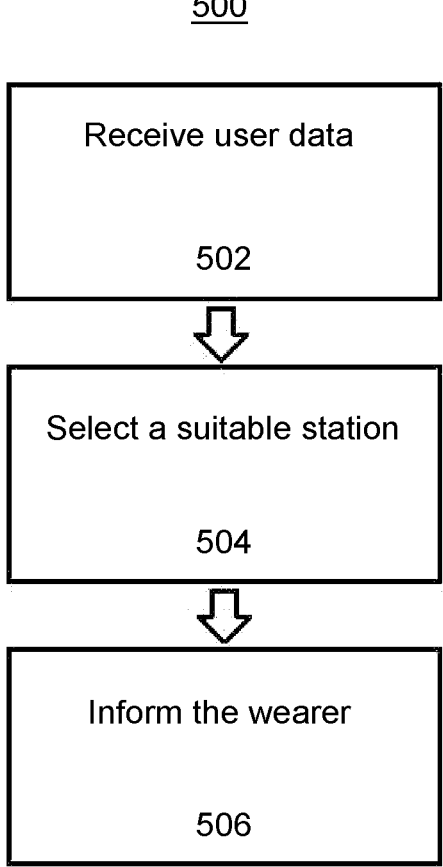
FIG. 4 is a flowchart showing steps of method for selecting a suitable station out of a plurality of available stations.

FIG. 4 is a flowchart showing steps of method 500 for selecting a suitable station out of a plurality of available stations.

The method 500 may start at block 502 in which the computer system 400 receives wearer data 212 from the contactless identification tag 200. For example, the received wearer data 212 indicates that a user only plays game B.

The method 500 may proceed to block 504 in which the computer system 400 determines a suitable station for the wearer. For example, there are ten available stations. Stations one, three, and seven have game B installed. The computer system 400 determines that stations one, three, and seven are suitable stations for the wearer.

The method may proceed to block 506 in which the computer system 400 informs the wearer of the suitable stations. For example, there is an LED light above each station. The LED lights above stations one, three, and seven are turned on to indicate that these are suitable stations for the wearer.

Methods in this document are illustrated as blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described method blocks can be combined in any order to implement the illustrated method, or alternate methods. Additionally, individual blocks may be deleted from the methods without departing from the spirit and scope of the subject matter described herein.

I claim:

1. A wearable data storage garment comprising:
a garment body;
a housing embedded in the garment body;
a contactless identification tag housed inside of the housing;
wherein
the contactless identification tag is configured to store wearer data; and
the contactless identification tag is configured to transmit the wearer data to a contactless identification tag reader when the contactless identification tag is near the contactless identification tag reader; and
the contactless identification tag does not contain an internal power source; and
the wearer data includes location access credentials or a uniform resource identifier providing instructions on how to reach the location access credentials; and
when the contactless identification tag reader receives the location access credentials from the contactless identification tag, the wearer is granted access to a location.

2. A wearable data storage garment comprising:
a garment body;
a housing embedded in the garment body;
a contactless identification tag housed inside of the housing;
wherein
the contactless identification tag is configured to store wearer data; and
the contactless identification tag is configured to transmit the wearer data to a contactless identification tag reader when the contactless identification tag is near the contactless identification tag reader; and
the contactless identification tag does not contain an internal power source; and
the wearer data includes login access credentials or a uniform resource identifier providing instructions on how to reach the login access credentials; and
when the contactless identification tag reader receives the login access credentials from the contactless identification tag, the wearer is granted access to an account associated with a website, desktop application, or mobile application.

3. A wearable data storage garment comprising:
a garment body;
a housing embedded in the garment body;
a contactless identification tag housed inside of the housing;

wherein
the contactless identification tag is configured to store
wearer data; and
the contactless identification tag is configured to transmit
the wearer data to a contactless identification tag reader
when the contactless identification tag is near the
contactless identification tag reader; and
the contactless identification tag does not contain an
internal power source; and
the garment is part of a contactless identification system,
the contactless identification system including at least
the garment and a peripheral device that houses the
contactless identification tag reader; and
when the peripheral device is connected with a computer
system, the contactless identification tag reader is in
communication with the computer system; and
the peripheral device is a USB-type housing; and
the wearer data includes at least one of:
    performance metrics related to wearer performance in
        an electronic game;
    a uniform resource identifier providing instructions on
        how to reach the performance metrics;
    login access credentials associated with a website,
        desktop application, or mobile application; and
    a uniform resource identifier providing instructions on
        how to reach the login access credentials.

4. The garment of claim 3, wherein
performance metrics are updated during or after gameplay
of the electronic game.

5. A wearable data storage garment comprising:
a garment body;
a housing embedded in the garment body;
a contactless identification tag housed inside of the hous-
    ing;
wherein
the contactless identification tag is configured to store
    wearer data; and
the contactless identification tag is configured to transmit
    the wearer data to a contactless identification tag reader
    when the contactless identification tag is near the
    contactless identification tag reader; and
the contactless identification tag does not contain an
    internal power source;
the garment is part of a contactless identification system,
    the contactless identification system including at least
    the garment housing the contactless identification tag,
    the contactless identification tag reader, a computing
    device in communication with the contactless identifi-
    cation tag reader, and an output device;
when the contactless identification tag reader receives the
    wearer data:
    the computing device selects a suitable station from a
        plurality of available stations, the selection based on
        the wearer data; and
    the output device informs the wearer of the suitable
        station.

6. The garment of claim 5, wherein
the wearer data includes gameplay history of the wearer
    or a uniform resource identifier providing instructions
    on how to reach the gameplay history; and
the suitable station includes a computer system having
    games played by the wearer in his or her gameplay
    history.

7. The garment of claim 5, wherein
the wearer data includes work history of the wearer or a
    uniform resource identifier providing instructions on
    how to reach the work history; and
the suitable station includes a computer system having
    work programs used by the wearer in his or her work
    history.

8. The garment of claim 5, wherein
the wearer data includes work history of the wearer or a
    uniform resource identifier providing instructions on
    how to reach the work history; and
the suitable station includes tools used by the wearer in his
    or her work history.

9. A method of selecting a suitable station out of a
plurality of available stations, the method comprising steps
of:
    receiving, via a contactless identification tag reader of a
        computer system, wearer data from a contactless iden-
        tification tag of a wearer;
    determining, via the computer system, the suitable station
        for the wearer;
    informing the wearer, via an output device of the com-
        puter system, of the suitable station;
    wherein
    the determination of the suitable station is made based on
        the wearer data.

10. The method of claim 9, wherein
the wearer data includes gameplay history of the wearer
    or a uniform resource identifier providing instructions
    on how to reach the gameplay history; and
the suitable station includes a computer system having
    games played by the wearer in his or her gameplay
    history.

11. The method of claim 9, wherein
the wearer data includes work history of the wearer or a
    uniform resource identifier providing instructions on
    how to reach the work history; and
the suitable station includes a computer system having
    work programs used by the wearer in his or her work
    history.

12. The method of claim 9, wherein
the wearer data includes work history of the wearer or a
    uniform resource identifier providing instructions on
    how to reach the work history; and
the suitable station includes tools used by the wearer in his
    or her work history.

* * * * *